(12) United States Patent
Kim et al.

(10) Patent No.: US 7,649,897 B2
(45) Date of Patent: Jan. 19, 2010

(54) METHOD AND APPARATUS FOR TRANSMITTING DATA IN A SYSTEM USING NETWORK ADDRESS TRANSLATION

(75) Inventors: Geon-woo Kim, Daejeon (KR); Jae-hoon Nah, Daejeon (KR); Sung-won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1437 days.

(21) Appl. No.: 10/334,939

(22) Filed: Dec. 31, 2002

(65) Prior Publication Data

US 2004/0071149 A1    Apr. 15, 2004

(30) Foreign Application Priority Data

Oct. 12, 2002   (KR)   ............. 10-2002-0062249

(51) Int. Cl.
H04L 12/28   (2006.01)
(52) U.S. Cl. ............. 370/401; 370/466; 370/252; 713/201
(58) Field of Classification Search .............. 726/3, 726/11, 12, 14, 15; 370/389, 400, 401
See application file for complete search history.

(56) References Cited

U.S. PATENT DOCUMENTS 6,963,982 B1* 11/2005 Brustoloni et al. ............. 726/15
7,032,242 B1* 4/2006 Grabelsky et al. ............. 726/11
2002/0116523 A1* 8/2002 Warrier et al. ............. 709/238
2003/0233576 A1* 12/2003 Maufer et al. ............. 713/201
2005/0223095 A1* 10/2005 Volz et al. ............. 709/225

FOREIGN PATENT DOCUMENTS

KR   2001-0087322   9/2001

OTHER PUBLICATIONS

"A Multi-layer security service with NAT router", S. Som, et al., Electronics and Telecommunications Research Institute, Honam University, 9 pages.

* cited by examiner

*Primary Examiner*—Duc C Ho
(74) *Attorney, Agent, or Firm*—Blakely, Sokoloff, Taylor & Zafman LLP

(57) ABSTRACT

There are provided an apparatus and method for transmitting data in a network system using network address translation. The method for transmitting data includes the steps of receiving a global network address corresponding to a local network address from a router using network address translation; encoding data using the global network address; and transmitting the encoded data to an external host on the global network via the router. Since the network address to be translated through the network address translation can be anticipated and substituted in real time during the transmission of the data, a variety of security services can be provided without significant modifications to the existing system, and accordingly, it is anticipated that the Internet protocol version 6 can be increasingly used.

9 Claims, 4 Drawing Sheets

METHOD AND APPARATUS FOR TRANSMITTING DATA IN A SYSTEM USING NETWORK ADDRESS TRANSLATION

This application claims the priority of Korean Patent Application No. 2002-62249, filed on Oct. 12, 2002, in the Korean Intellectual Property Office, the disclosure of which is incorporated herein in its entirety by reference.

BACKGROUND OF THE INVENTION

1. Field of the Invention

The present invention relates to data transmission, and more particularly, to a method and apparatus for transmitting data in a system using network address translation.

2. Description of the Related Art

Data transmission is conventionally performed in a system for providing an end-to-end integrated security service, such as an IP security protocol (IPSEC) service or a virtual private network (VPN) service, in which a particular network environment such as a network address translation (NAT) is not considered. Meanwhile, not every function of the end-to-end integrated security service is available in a system using the NAT.

Although various methods such as IPSEC tunnel mode or realm specific IP (RSIP) have been proposed to solve the above described problems, such methods still have a problem in that the applicable environment or system is limited, or the system should be significantly modified to support a particular protocol.

SUMMARY OF THE INVENTION

It is an aspect of the present invention to provide a method and apparatus for transmitting data in a system using network address translation, which are compatible with an existing system and in which every function of the existing system can be used without limitation.

It is another aspect of the present invention to provide a computer readable recording medium that stores a computer program to implement the method for transmitting data according to an aspect of the present invention.

A method for transmitting data according to the present invention includes the steps of receiving a global network address corresponding to a local network address from a router using network address translation; encoding data using the global network address; and transmitting the encoded data to an external host on the global network via the router.

An apparatus for transmitting data according to the present invention includes a router connector for receiving a global network address corresponding to a local network address from a router using network address translation; a data processor for encoding data using the global network address; and a data transmitter for transmitting the encoded data to an external host on the global network via the router.

BRIEF DESCRIPTION OF THE DRAWINGS

The above objects and advantages of the present invention will become more apparent by describing preferred embodiments thereof with reference to the attached drawings in which.

DETAILED DESCRIPTION OF THE INVENTION

Figure 1:
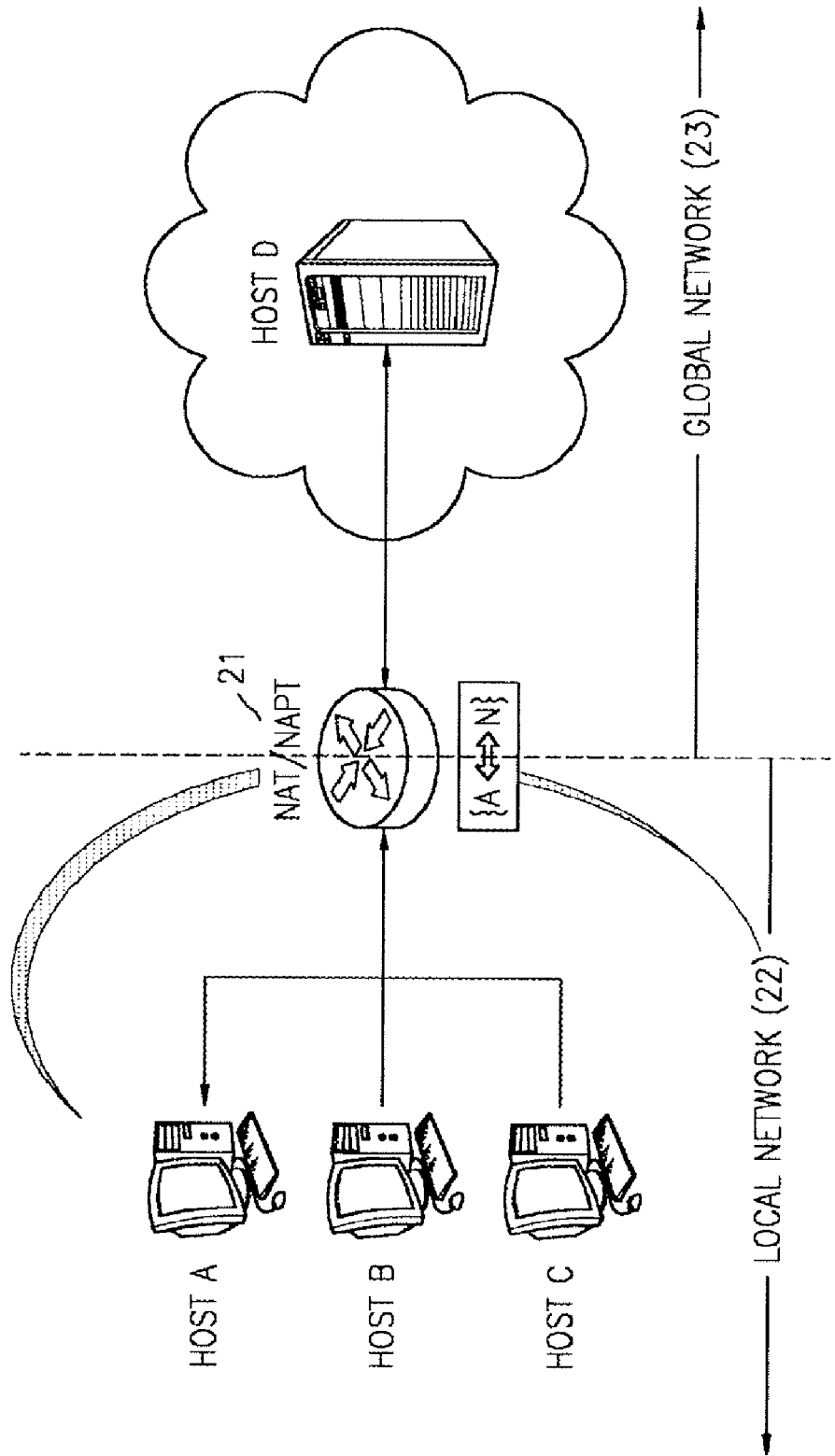
FIG. 1 is a schematic diagram for explaining network address translation.

First of all, the concept of network address translation will be described with reference to FIG. 1. The term network address translation in this description includes not only network address translation (NAT) in a restricted meaning, but also network address port translation (NAPT). The NAT and NAPT are collectively referred to as NAT hereinafter.

The NAT refers to a technology used to solve an IP address shortage problem by utilizing a local IP address for communication within a local network and a global IP address for communication through a global network like the Internet.

Generally, the NAT is implemented in a router 21 placed on the boundary between the local network 22 and the global network 23. When a host A tries to communicate with a host D, a packet having a source address of A and a destination address of D is transmitted from the host A. The packet is processed using the NAT in the router 21, and the source address is converted to N. Therefore, the packet transmitted through the router 21 is converted to have a source address of N and a destination address of D.

On the other hand, when the host D tries to communicate with the host A, a packet transmitted from the host D has a source address of D and a destination address of N. The packet is processed using the NAT in the router 21, and the destination address is converted to A. Therefore, the packet transmitted through the router 21 is converted to have a source address of D and a destination address of A.

Figure 2:
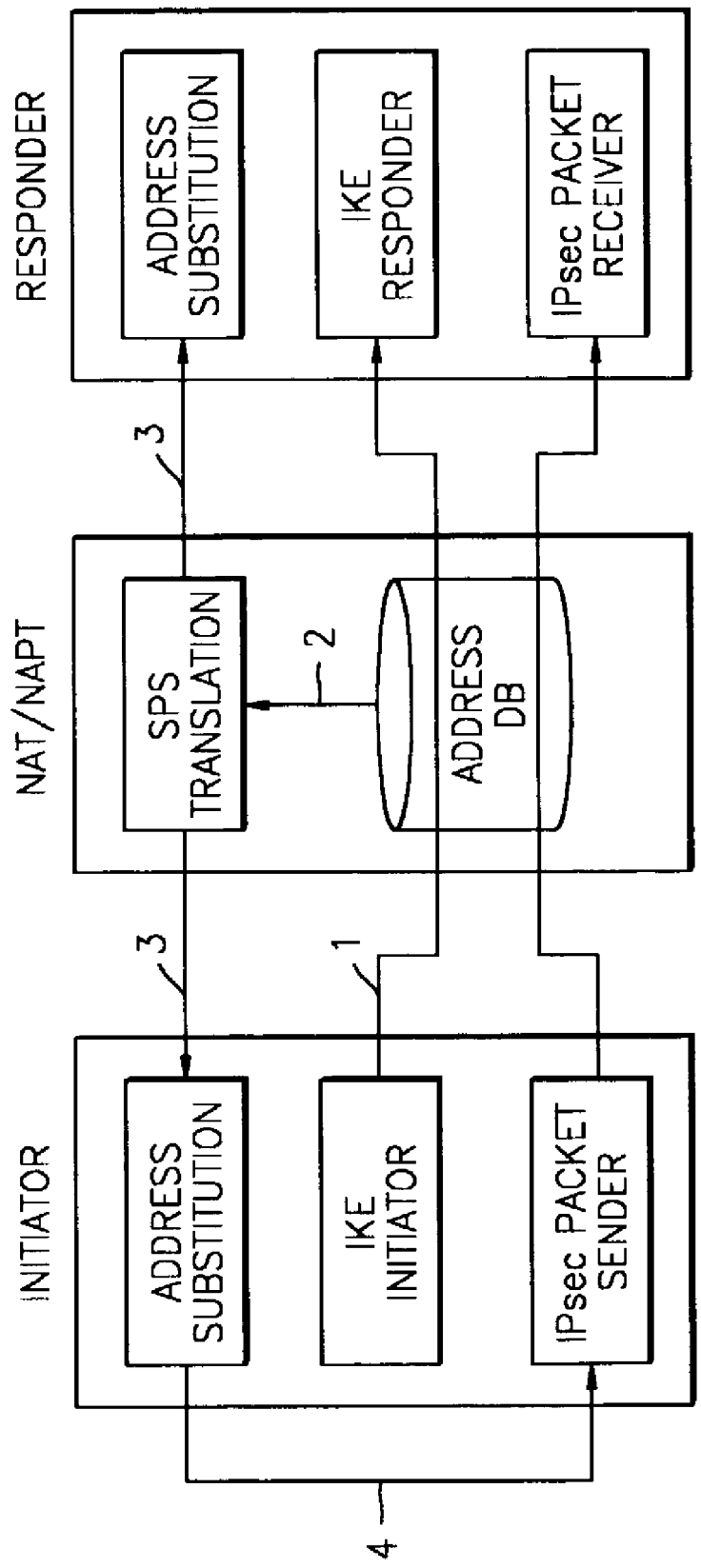
FIG. 2 is a schematic diagram of an apparatus for transmitting data in a system using network address translation according to the present invention.

FIG. 2 is a schematic diagram of an apparatus for transmitting data in a system using network address translation according to the present invention. While the present invention is applicable to any environment where the data transmission based on the NAT is performed, a preferred embodiment of the present invention will be described in regard to an environment to which an IP security (IPSEC) technology is applied.

In addition to an end-to-end security service, the IPSEC technology provides a variety of security services through combinations of modes, encoding protocols, and encoding algorithms. In these days, the IPSEC technology is widely used in virtual private network (VPN) services. An example of the VPN service is to allow a remote user to access to a common intranet.

However, in a place like a hotel or a network device like a home gateway where remote users frequently use the service, the NAT is preferably used and there is a difficulty in providing the end-to-end integrated security service using the IPSEC technology. Since further development and popularization of the IPSEC and the VPN as well as Internet protocol version 6 are limited if such a difficulty is not solved, various solutions such as IPSEC tunnel mode or realm specific IP (RSIP) have been proposed.

The IPSEC tunnel mode provides a restricted environment for allowing an IPSEC packet to pass through the NAT. Only the IPSEC tunnel mode that does not include an outside IP header in authentication hash is used, and a validity of a source address is not inspected. Further, any-to-any security policy database entry negotiation is used. However, in order to prevent this problem, system requirements should be restricted such that one client is allowed within a NAT system and a session is continuously activated, and accordingly, every function of the IPSEC cannot be utilized.

The RSIP is a recently developed IP address translation method to overcome the shortcomings of prior arts wherein lots of application level gateways (ALG) are required for supporting various user application programs. A server negotiates with clients using RSIP communications protocol with respect to parameters related to the translation of the IP address to be used by the clients and a method for tunnelling, and administrates information on the status of each client. The RSIP has been proposed as an alternative to the existing NAT, but modifications to the clients are requisite to support the RSIP protocols for enabling the clients to communicate with the RSIP server and to support the tunnelling for communicating with a global host.

In order to solve the problems of the conventional methods as described above, the method for transmitting data according to the present invention anticipates a translated IP address and substitutes IP addresses in real time so that the translated IP address can be used in data processing such as encoding, etc. For this purpose, the method for transmitting data according to the present invention utilizes techniques for monitoring a cache database in real time, substituting IP addresses at an input portion of an encoding module of a real time packet, modifying an embedded IP header, and adding a new field to a security policy database.

Since security association (SA) for inter key exchange (IKE) is negotiated first, as indicated by arrow 1 in FIG. 2, before transmitting the IPSEC packet, the NAT system detects and transmits a translated address to the hosts at both ends as indicated by arrow 3 in FIG. 2. Since the IP address to be translated is known before the transmission of the IPSEC packet including actual data, each host can apply encoding algorithms based on the IP address to be translated, as indicated by arrow 4 in FIG. 4. For example, each host can obtain a transparent check sum of the data.

Figure 3:
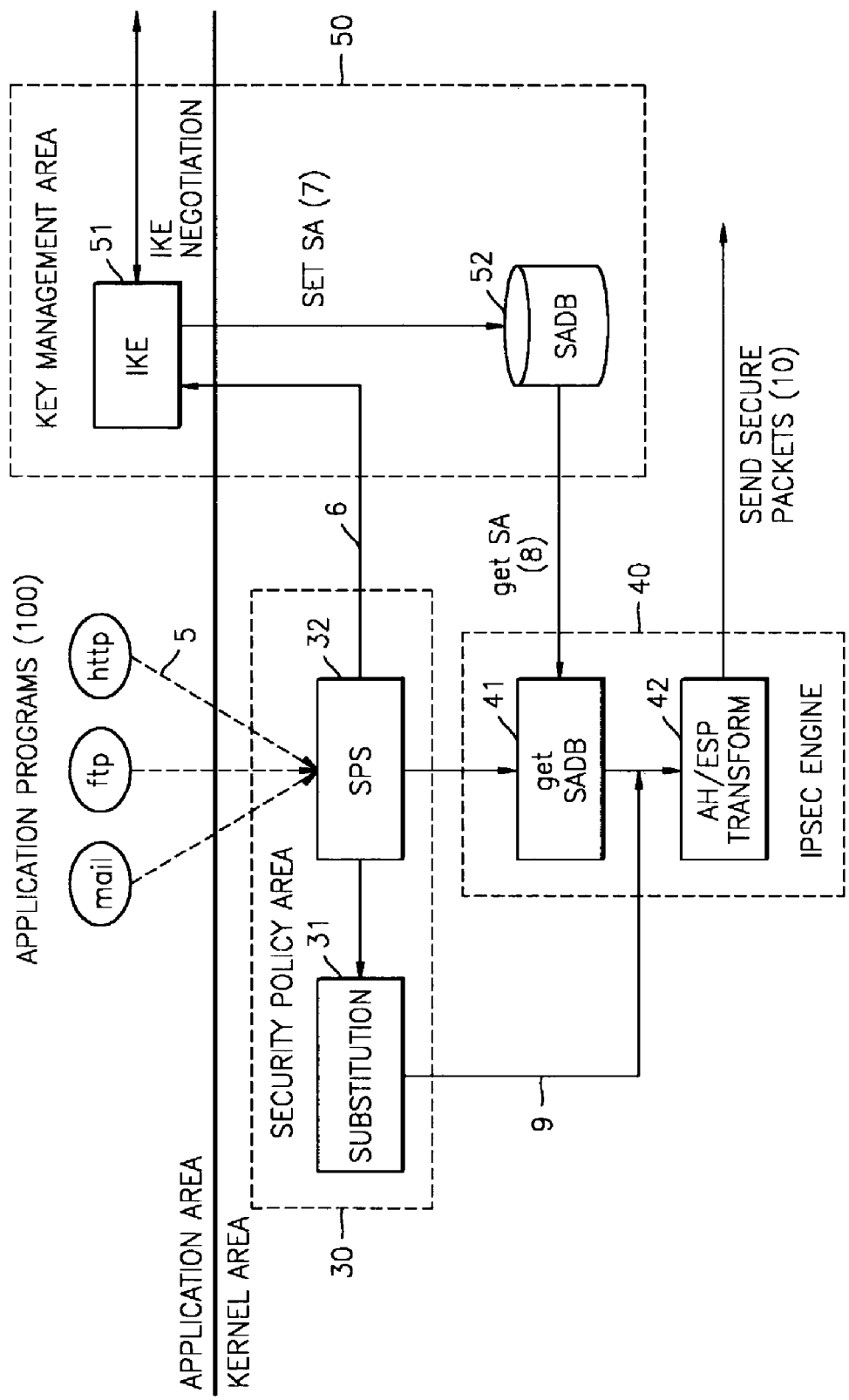
FIG. 3 is a block diagram of an IPSEC system in which network address translation is considered.

FIG. 3 is a block diagram of an IPSEC system in which network address translation is considered.

When an application program 100 such as telnet or file transfer protocol (FTP) requests IPSEC communications as indicated by arrow 5, SA negotiation is requested first to IKE 51 as indicated by arrow 6, and IKE negotiation packet with a translated IP address is transmitted from the NAT system as indicated by arrow 7. Then, a kernel stores corresponding translation address list in a cache database 52, and tries to encode an actual IPSEC packet to be transmitted. At this instant, a source address is used as an input of authentication module 42 for producing an authentication header (AH) or performing an encapsulating security payload (ESP), and a local network address is substituted with an IP address on a global network, which is translated at the NAT system, as indicated by arrow 9.

A substitution module 31 for substituting IP addresses as described above can be added without limitation on or modification to the function of the existing IPSEC system. That is, transparency can be provided to the existing IPSEC system.

Figure 4:
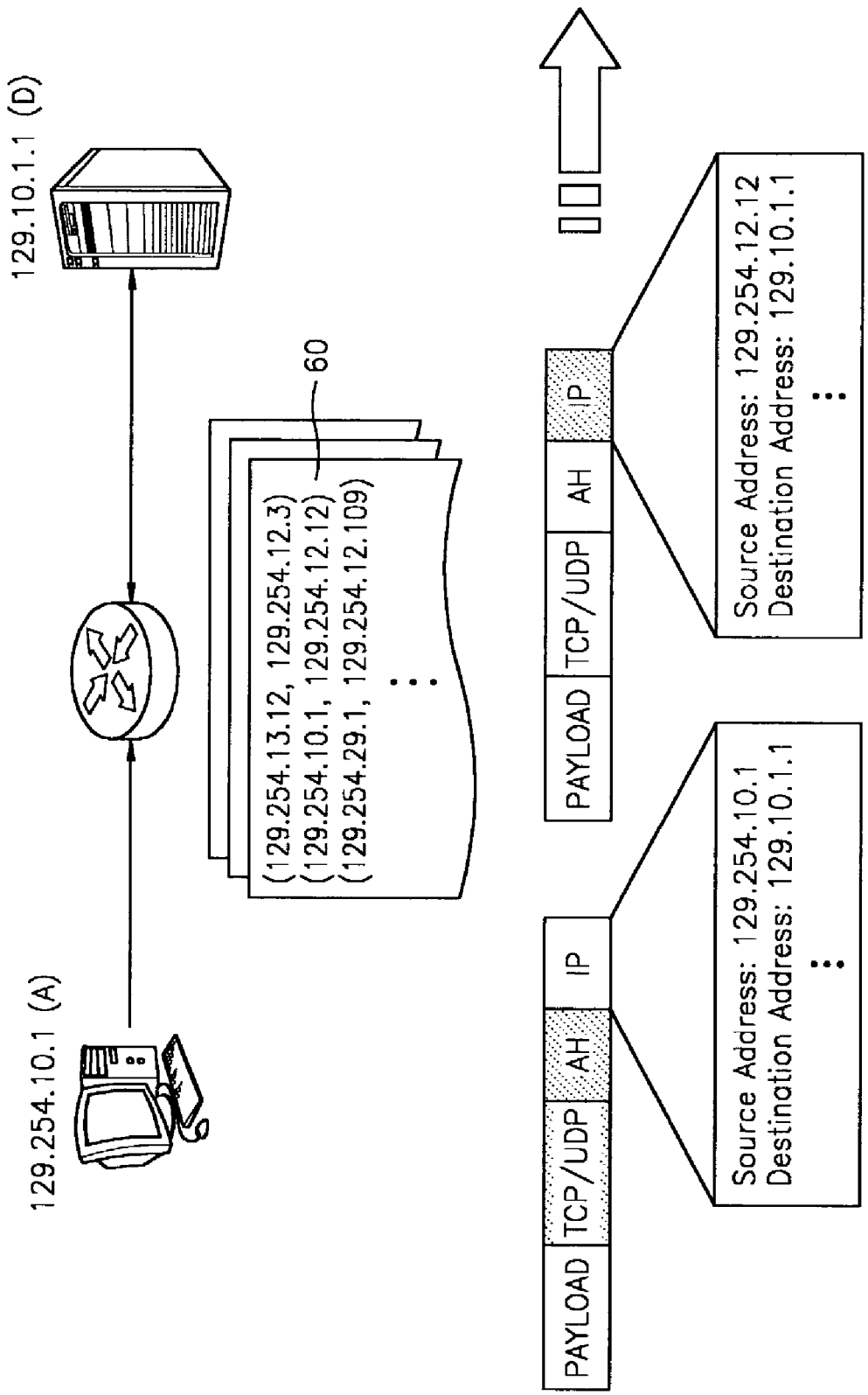
FIG. 4 is a schematic diagram of a method for transmitting data according to the present invention, which shows an actual example of transmission of packets.

FIG. 4 is a schematic diagram of a method for transmitting data according to the present invention, which shows an actual example of transmission of packets in a case that a host A having a local IP address of 129.254.10.1 communicates in an IPSEC mode with a host D having a global IP address of 129.10.1.1 on a global network.

First of all, the host A transmits an IKE negotiation packet to negotiate new security association (SA). While the packet passes through the NAT system, an IP address available from an address pool is assigned to the packet. That is, the IP address of the packet is translated into a new source address, and then, the packet having the new source address is transmitted to the host D. Records on the translation of the IP address are stored in a cache database 60 of the NAT system, and are detected by a security policy system-application level gateway (SPS-ALG) and transmitted to both of the hosts.

During the data transmission, the host A transmits a secure packet by applying a check sum, an AH, and an embedded IP with an IP address to be translated of 129.254.12.12. While the packet passes through the NAT system, the local IP address of the IP header thereof, 129.254.10.1, is translated into a global IP address, 129.254.12.12, and then, the packet is transmitted to the host D with the translated global IP address. When the packet is received, the host D decodes the received packet so that the IPSEC inbound packet can be processed.

As described above, the method for transmitting data in a system using network address translation according to the present invention anticipates and applies a translated source address of an IPSEC packet passing through a NAT system to solve the problems of authentication invalidation of a message occurring while processing an IPSEC inbound packet, TCP/UDP check sum errors and an embedded IP, etc. Further, the apparatus and method for transmitting data according to the present invention can be easily applied to and used in an existing system, without significant modifications to the existing IPSEC or IKE and NAT system, by merely adding a module for monitoring a cache database to the NAT system and adding a module for substituting the source address before the application of an encoding module. Accordingly, while restricted services can have been provided in a conventional VPN using the IPSEC, any and all of the security services of the IPSEC can be integrally provided according to the present invention.

Further, the Internet protocol version 6 developed to overcome the shortage of Internet IP addresses utilizes the NAT technology for the compatibility with Internet protocol version 4. Since the problems between the IPSEC that is provided as a basic security service and the NAT can be solved according to the present invention, it is anticipated that the Internet protocol version 6 can be increasingly used.

The present invention can be implemented as a computer readable code on a recording medium and executed on a computer. The recording medium may include any kind of recording devices on which data is stored. Examples of the recording medium include ROM, RAM, CD-ROM, magnetic tape, hard discs, floppy discs, flash memory, optical data storage devices, and even carrier wave, for example, transmission over the Internet. Moreover, the recording medium may be distributed among computer systems that are interconnected through a network, and the present invention may be stored and implemented as a compute code in the distributed system.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A data transmitting method in an internal host, comprising:
   receiving a global network IP address of the internal host, wherein the global network IP address is obtained by translation in a router from a local network IP address of the internal host;
   encoding data—the local network address_using the global network IP address of the internal host;

transmitting the encoded data using the global network IP address as a source address of a packet header to the external host; and setting security association with the external host before receiving the global network IP address, wherein the router assigns the global network IP address corresponding to the local network IP address while the setting is performed.

2. The method for transmitting data according to claim 1, wherein the encoding data includes obtaining a transport check sum of the data using the global network IP address.

3. The method for transmitting data according to claim 1, wherein the encoding data includes producing an authentication header for the data using the global network IP address.

4. The method of transmitting data according to claim 1, wherein the encoding data includes performing an encapsulating security payload (ESP) for the data using the global network address.

5. A data transmitting apparatus in an internal host, comprising:

a router connector for receiving a global network IP address of the internal host, wherein the global network IP address is obtained by translation in a router from a local network IP address of the internal host;

a data processor for encoding the local network address using the global network IP address of the internal host;

a data transmitter for transmitting the encoded data using the global network IP address as a source address of a packet header to the external host;

a security association setting unit for setting security association with the external host, wherein the router assigns the global network IP address corresponding to the local network IP address while security association is negotiated by security association setting unit.

6. The apparatus for transmitting data according to claim 5, wherein the data processor includes a check sum generator for obtaining a transport check sum of the data using the global network IP address.

7. The apparatus for transmitting data according to claim 5, wherein the data processor includes a header generator for producing an authentication header for the data using the global network IP address.

8. The apparatus of transmitting data according to claim 5, wherein the data processor includes an encapsulating unit for performing an encapsulating security payload (ESP) for the data using the global network address.

9. A computer readable recording medium that stores a computer program which when executed by a processor implements a data transmitting method in an internal host, the method comprising:

receiving a global network IP address of the internal host, wherein the global network IP address is obtained by translation in a router from a local network IP address of the internal host;

encoding data—the local network address using the global network IP address of the internal host;

transmitting the encoded data using the global network IP address as a source address of a packet header to the external host; and setting security association with the external host before receiving the global network IP address, wherein the router assigns the global network IP address corresponding to the local network IP address while the setting is performed.

* * * * *